(12) United States Patent
Yao

(10) Patent No.: US 11,315,426 B2
(45) Date of Patent: Apr. 26, 2022

(54) METHOD FOR DYNAMICALLY CONFIGURING VEHICLE PARKING SPACES AND COMPUTER DEVICE

(71) Applicant: HON HAI PRECISION INDUSTRY CO., LTD., New Taipei (TW)

(72) Inventor: Chia-Li Yao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/198,649

(22) Filed: Mar. 11, 2021

(65) Prior Publication Data

US 2021/0375136 A1 Dec. 2, 2021

(30) Foreign Application Priority Data

May 27, 2020 (CN) .......................... 202010458999.X

(51) Int. Cl.
  *G08G 1/14* (2006.01)
  *G08B 5/36* (2006.01)
  *G06V 20/00* (2022.01)
  *G06V 20/52* (2022.01)

(52) U.S. Cl.
  CPC ............. *G08G 1/142* (2013.01); *G06V 20/00* (2022.01); *G06V 20/52* (2022.01); *G08B 5/36* (2013.01)

(58) Field of Classification Search
  CPC ...... G08G 1/142; G08B 5/36; G06K 9/00624; G06V 20/00; G06V 20/52
  USPC ........................................................ 340/932.2
  See application file for complete search history.

(56) References Cited

U.S. PATENT DOCUMENTS

| | | | | |
|---|---|---|---|---|
| 9,997,070 | B1* | 6/2018 | Komanduri | H05B 47/195 |
| 10,152,639 | B2* | 12/2018 | Pathangay | G06T 7/74 |
| 10,170,003 | B2* | 1/2019 | Boss | G08G 1/143 |
| 10,311,723 | B2* | 6/2019 | Sehra | H04N 7/181 |
| 10,586,457 | B2* | 3/2020 | Boss | G08G 1/146 |
| 10,593,129 | B2* | 3/2020 | Bruce | G07B 15/02 |
| 2021/0276542 | A1* | 9/2021 | Mizuno | G08G 1/146 |

FOREIGN PATENT DOCUMENTS

CN 110211408 A 9/2019

* cited by examiner

*Primary Examiner* — John A Tweel, Jr.
(74) *Attorney, Agent, or Firm* — ScienBiziP, P.C.

(57) ABSTRACT

A method for dynamically configuring as required the layout and number of parking spaces for various types of vehicles includes acquiring types of vehicles entering a parking lot, the parking lot comprising at least two types of parking spaces, and determining whether available parking spaces as currently laid out match the types and numbers of types of vehicles entering the parking lot. Available parking spaces can be provided or rearranged to match the vehicles entering the parking lot if there is a sufficiency of space to accommodate and match the plurality of vehicles to enter the parking lot.

15 Claims, 5 Drawing Sheets

METHOD FOR DYNAMICALLY CONFIGURING VEHICLE PARKING SPACES AND COMPUTER DEVICE

CROSS-REFERENCE TO RELATED APPLICATIONS

This application claims priority to Chinese Patent Application No. 202010458999.X filed on May 27, 2020, the contents of which are incorporated by reference herein.

FIELD

The subject matter herein generally relates to information processing technology.

BACKGROUND

Traditional parking lots generally are designed before construction, for the types and number of parking spaces. For example, a parking lot can be constructed for parking trucks, cars, or electric vehicles, and the configurations of the parking spaces are determined by pre-drawn lines or obstacles. However, often, one or many of the parking spaces are vacant, and the actual demand is not being met. For example, if there are many electric car users on weekdays, the demand for electric car parking in the parking lot is heavy; shopping mall parking lots may be more active during holidays, and if there are activities involving a certain type of vehicle, there will be a large demand for car parking of that type of vehicle. A fixed parking configuration may result in low parking lot utilization and failures in meeting demands of diverse parking needs.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
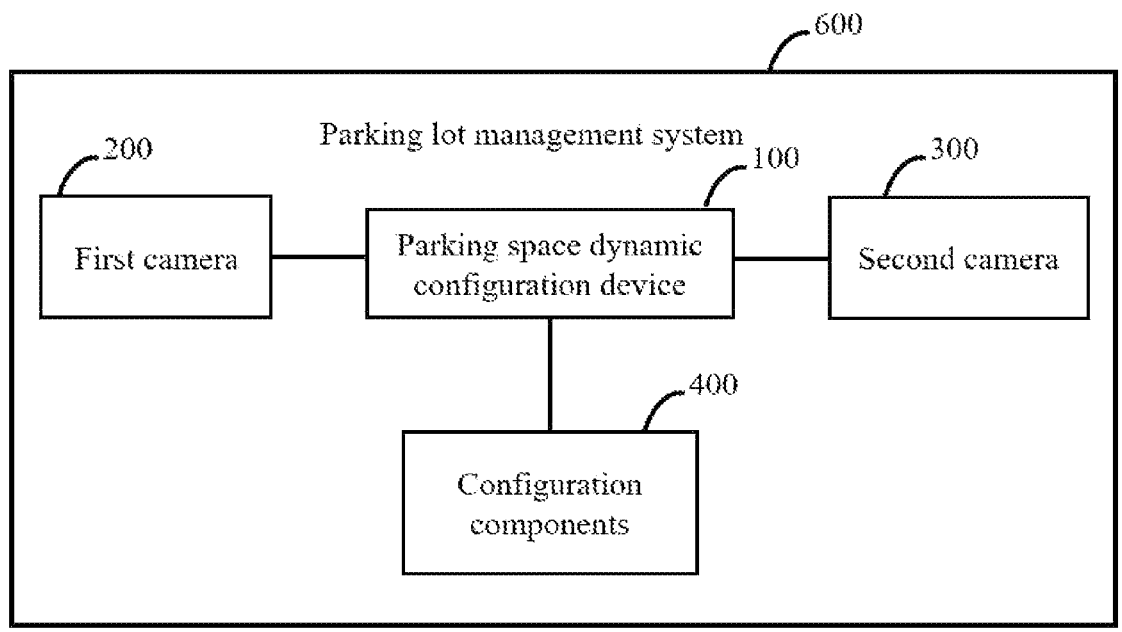
FIG. 1 is a schematic diagram of a network environment of a parking lot management system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 is a schematic diagram of a network environment of a parking lot management system 600. Depending on the embodiment, the parking lot management system 600 can include, but is not limited to, a parking space dynamic configuration device 100, a first camera 200, a second camera 300, and several configuration components 400. The parking space dynamic configuration device 100 can communicate with the first camera 200, the second camera 300, and the several configuration components 400 at the same time.

In at least one embodiment, the first camera 200 can acquire images of vehicles entering a parking lot and send the images to the parking space dynamic configuration device 100.

In at least one embodiment, the second camera 300 can acquire images of vehicles leaving the parking lot and send the images to the parking space dynamic configuration device 100. The images of vehicles may be images of a license plate of the vehicles or images of the whole vehicles.

The configuration components 400 are installed in the parking lot and can configure the parking lot as at least two types of parking spaces. By switching the configuration components 400, conversion between the at least two types of parking spaces can be realized. Furthermore, a rearrangement of the at least two parking spaces in at least part of the parking lot can be realized by switching the configuration components 400.

In at least one embodiment, the configuration components 400 can be lamps that can emit visible light.

Figure 5:
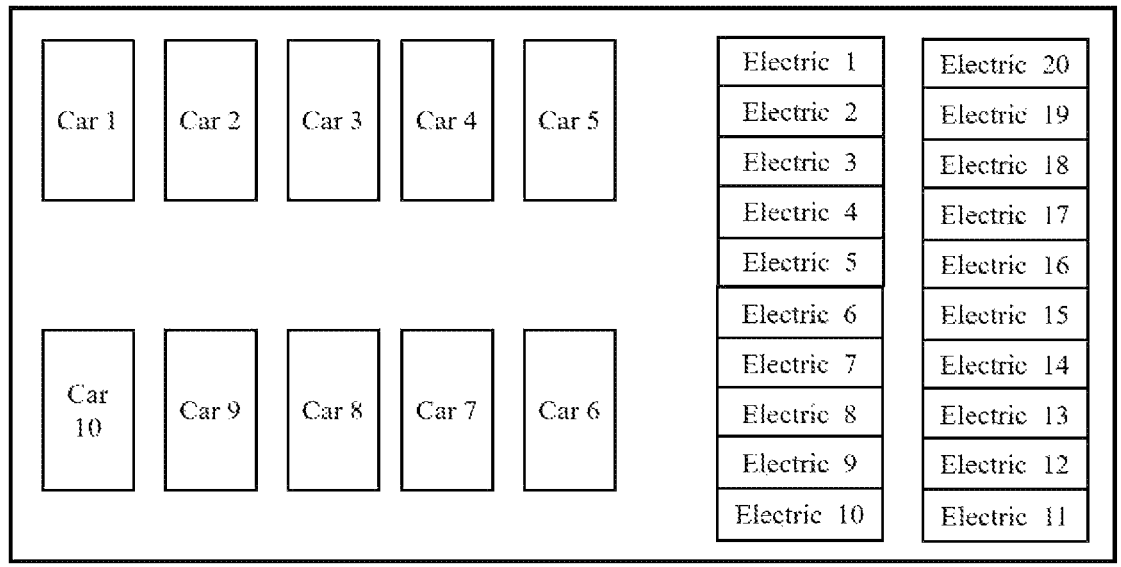
FIG. 5 illustrates a schematic diagram of parking spaces of a parking lot in a first state.
Figure 6:
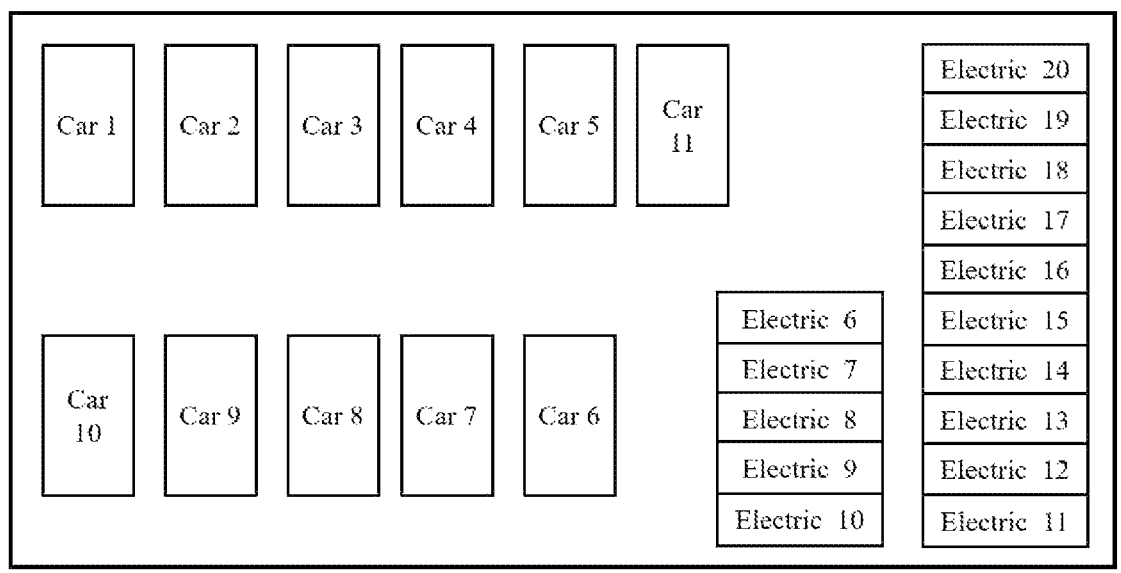
FIG. 6 illustrates a schematic diagram of parking spaces of the parking lot in a second state.

In at least one embodiment, the configuration components 400 can be LED lights. The parking lot can be configured into different parking spaces through the LED lights. For example, four connected sides of the parking space are equipped with the LED lights. The parking space can be seen as available when the LED lights of the four sides are turned on, and the parking space can be seen as unavailable when the LED lights of the four sides are turned off. By turning on or off the LED lights to identify part of the at least two parking spaces in the parking lot as available parking spaces and some as unavailable parking spaces, the conversion of the at least two types of parking spaces is realized. Referring to FIG. 5 and FIG. 6, cars 1-10 are parking spaces for cars, and electric 1-10 are parking spaces for motorcycles. By turning on the LED lights of the electric 1 to electric 5 parking spaces, the five consecutive parking spaces for motorcycles can be changed to a vehicle parking space, as shown in FIG. 6.

In at least one embodiment, the rearrangement of at least two parking spaces in some areas of the parking lot is realized by turning on or off the LED lights.

In other embodiments, other conversions can be achieved by turning on and/or off the LED lights, for example, change one car parking space into five motorcycle parking spaces, and change three car parking spaces into two MPV or SUV parking spaces.

In at least one embodiment, the configuration components 400 may be infrared transmitters or laser transmitters. The configuration components 400 can emit visible light to reconfigure the parking lot into different parking spaces.

Figure 2:
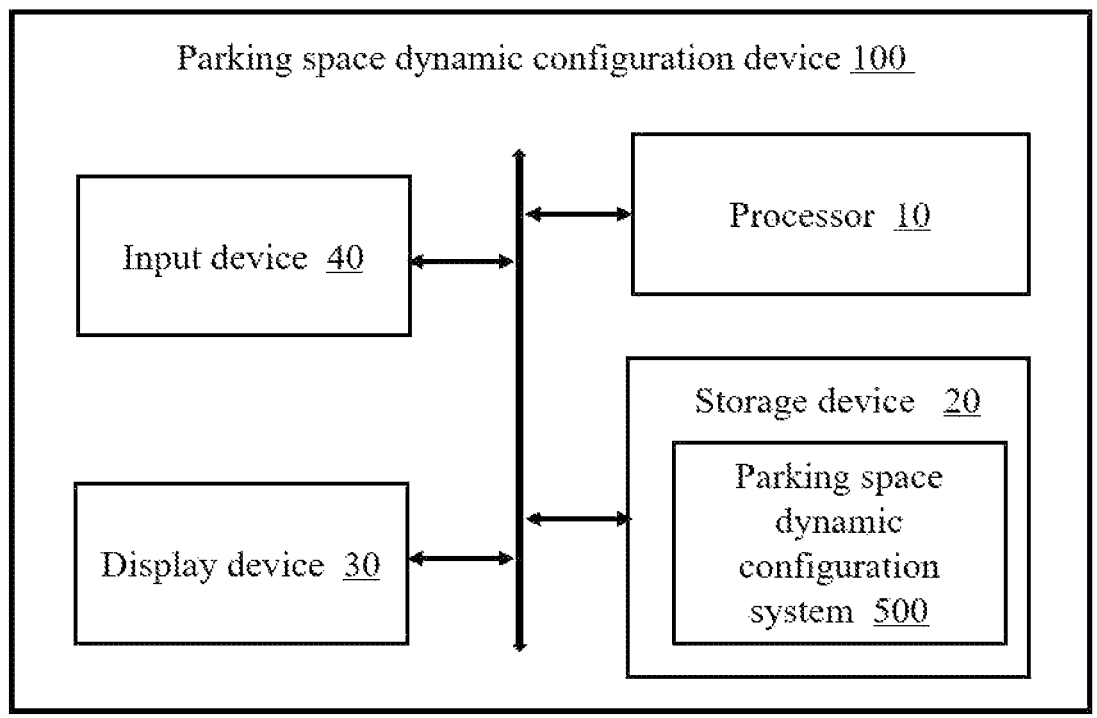
FIG. 2 is a block diagram of one embodiment of a parking space dynamic configuration device.

FIG. 2 is a block diagram of one embodiment of the parking space dynamic configuration device 100.

In at least one embodiment, the parking space dynamic configuration device 100 can include, but is not limited to, at least one processor 10, a storage device 20, a display device 30, and an input device 40.

In at least one embodiment, the processor 10 may be a central processing unit (CPU, Central Processing Unit), and may also include other general-purpose processors, digital signal processors (Digital Signal Processors, DSP), application specific integrated circuits (Application Specific Integrated Circuits, ASIC), ready-made programmable gate array (Field-Programmable Gate Array, FPGA) or other programmable logic devices, discrete gates or transistor logic devices, discrete hardware components, etc. The general-purpose processor can be a micro-processor or the processor can also be any conventional processor, etc. The processor 10 is the control center of the parking space dynamic configuration device 100, which uses various interfaces and lines to connect various parts of the device 100.

In at least one embodiment, the storage device 20 may be used to store various types of data in the parking space dynamic configuration device 100, such as vehicle images, number of vehicles, types of vehicles, and types and numbers of free parking spaces in parking lot. For example, the storage device 20 may be used to store a material counting system 10 installed in the computer device 1. The storage device 20 may include Read-Only Memory (ROM), Programmable Read-Only Memory (PROM), Erasable Programmable Read-Only Memory (EPROM), One-time Programmable Read-Only Memory (OTPROM), Electronically Erasable Programmable Read-Only Memory (EEPROM), Compact Disc Read-Only Memory (CD-ROM) or other optical disk storage, magnetic disk storage, magnetic tape storage, or any other non-volatile computer-readable storage medium that can be used to carry or store data.

In at least one embodiment, the display device 30 can display information processed by the processor 10, for example, display the number and distribution of at least two parking spaces in the parking lot. The display device 30 may be a display, a touch screen, or the like.

In at least one embodiment, the input device 40 may be used to input commands and information, and the input device 40 may be a keyboard, a touch screen, or the like.

In at least one embodiment, the processor 10, the storage device 20, the display device 30, and the input unit device 40 may be integrated in a computer device. In other embodiments, the display device 30 and the input device 40 may also be omitted.

In at least one embodiment, the parking space dynamic configuration device 100 may be a computing device such as a desktop computer, a notebook, a palmtop computer, and a cloud server. FIG. 2 illustrates only one example of the computer device 1, other examples can comprise more or fewer components than those shown in the embodiment, or have a different configuration of the various components. For example, the parking space dynamic configuration device 100 may also include network access equipment, buses, and the like. It should be noted that the parking space dynamic configuration device 100 is only an example, and other existing or future computer devices that may be adapted to the present disclosure are included in the scope of protection of the present claims and are included here by reference.

Figure 3:
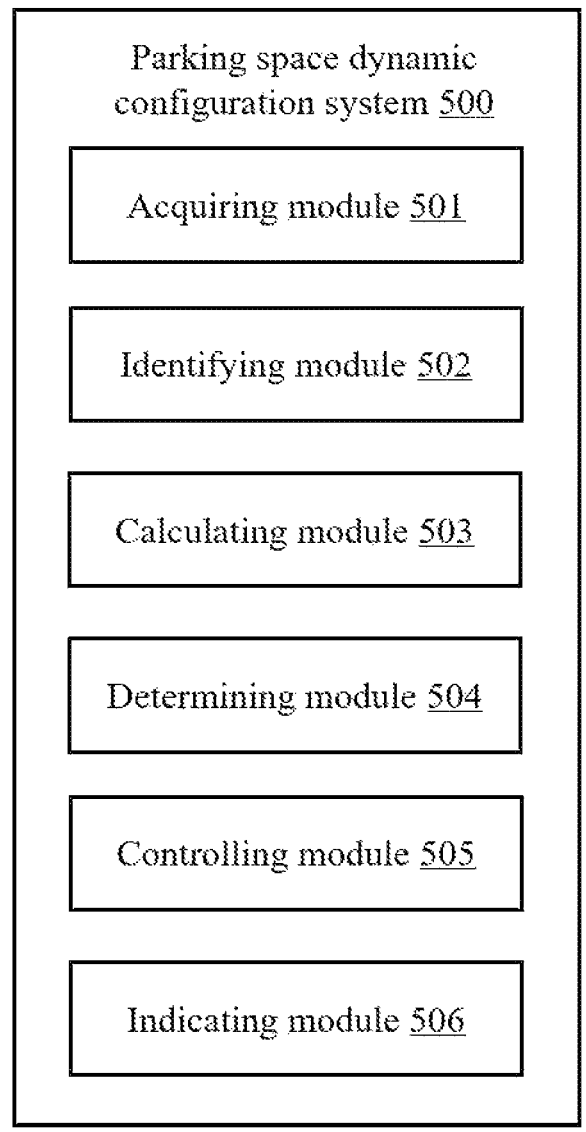
FIG. 3 illustrates a schematic diagram of functional modules of a parking space dynamic configuration system.

FIG. 3 is a block diagram of one embodiment of a parking space dynamic configuration system.

In at least one embodiment, the parking space dynamic configuration system 500 may include one or more modules, the one or more modules are stored in the storage device 20 and are executed by at least one or more processors (e.g., the processor 10 referred to in FIG. 3).

In at least one embodiment, the parking space dynamic configuration system 500 can be divided into multiple modules based on the functions performed. Referring to FIG. 3, the multiple modules include an acquiring module 501, an identifying module 502, a calculating module 503, a determining module 504, a controlling module 505, and an indicating module 506. The modules herein referred to are a series of computer-readable instruction segments that can be executed by at least one processor (such as the processor 10) and which can perform fixed functions and are stored in the storage device 20. In at least one embodiment, the functions of each module are illustrated in FIG. 3.

In at least one embodiment, the acquiring module 501 acquires vehicle images sent by the first camera 200 and the second camera 300.

In at least one embodiment, the vehicles images may be images of a license plate of the vehicle or images of the whole vehicle.

In at least one embodiment, the acquiring module 501 acquires dynamic configuration parameters. The dynamic configuration parameters include weather, time, gathering activities in a proximity to the parking lot, etc.

In at least one embodiment, the acquiring module 501 calls the input device 40, and a user inputs dynamic configuration parameter through the input device 40.

In at least one embodiment, the identifying module 502 identifies types of the vehicles based on the vehicle images and obtains a total number of the vehicles of each type.

In at least one embodiment, the identifying module 502 identifies the vehicle type through the vehicle images and obtains the number of such types. For example, by identifying the image of the whole vehicle and sequentially determining the type of the vehicle, or by pre-configuring a corresponding relationship between the license plate number and the vehicle type, the vehicle type can be determined based on the vehicle license plate number. Types of the vehicle can include at least electric vehicles, cars, trucks, and so on.

In at least one embodiment, the calculating module 503 calculates types and number of free parking spaces in the parking lot based on the identified vehicle types and number of each type.

In at least one embodiment, the calculating module 503 calculates types and number of free parking spaces through the types of vehicles entering or leaving the parking lot, the number of corresponding vehicles, and the configuration of parking spaces in the parking lot.

In at least one embodiment, the calculating module 503 calculates parking requirements of at least two types of vehicles according to the dynamic configuration parameters.

In at least one embodiment, the calculating module 503 estimates the demand for parking under the dynamic configuration parameters based on historical data. For example, the calculating module 503 estimates the parking demand by the workdays and non-workdays of the week and the historical weather by referencing the average parking demand of the parking lot on the workdays of the previous month and whether the weather of such days is sunny.

In at least one embodiment, the determining module 504 determines that the parking lot provides a plurality of free parking spaces that match the plurality of vehicles to enter the parking lot based on the types and number of free parking spaces.

In at least one embodiment, the controlling module 505 adjusts the parking spaces of the parking lot. For example, the controlling module 505 changes the type of at least one of the parking spaces, or rearranges at least two of the parking spaces in at least a part of the parking lot.

In at least one embodiment, the controlling module 505 sends a first command to the configuration components 400 to turn on or turn off the configuration components 400. The controlling module 505 converts at least one kind of free parking space to another kind of parking space to convert between at least two parking spaces in the parking lot.

In at least one embodiment, the controlling module 505 sends a second command to the configuration components 400 to turn on or turn off the configuration components 400 to realize a rearrangement of parking spaces in at least a part of the parking lot, to meet different requirements.

In at least one embodiment, the configuration components 400 can be LED lights. The parking lot can be configured into different parking spaces through the LED lights. For example, four connected sides of the parking space are equipped with the LED lights. The parking space is available when the LED lights of the four sides are turned on, and the parking space is unavailable when the LED lights of the four sides are turned off. By turning on or off the LED lights to identify part of the at least two parking spaces in the parking lot as available parking spaces and others as unavailable parking spaces, the conversion of the at least two types of parking spaces can be realized. Referring FIG. 5 and FIG. 6, the car 1 to car 10 are parking spaces for cars, and electric 1 to electric 10 are parking spaces for motorcycles. By turning on the LED lights of the electric 1 to electric 5 parking spaces, five consecutive parking spaces for motorcycles can be changed to a vehicle parking space, as shown in FIG. 6.

In at least one embodiment, the rearrangement of at least two parking spaces in some areas of the parking lot is realized by turning on and off the LED lights.

In other embodiments, other conversions can be achieved by turning on or off the LED lights, for example, changing one car parking space into five motorcycle parking spaces, and changing three car parking spaces into two MPV or SUV parking spaces.

In at least one embodiment, the configuration components 400 may be an infrared transmitter or a laser transmitter. The configuration components 400 emit visible light to configure the parking lot into different parking spaces.

On permission or refusal being issued, the indicating module 506 sends an instruction to the vehicles to enter or not enter the parking lot. The instruction can be voice instruction or image instruction. For example, the instruction can be a voice prompt. Further, such prompt may also include the location of the available parking space in the parking lot.

Figure 4:
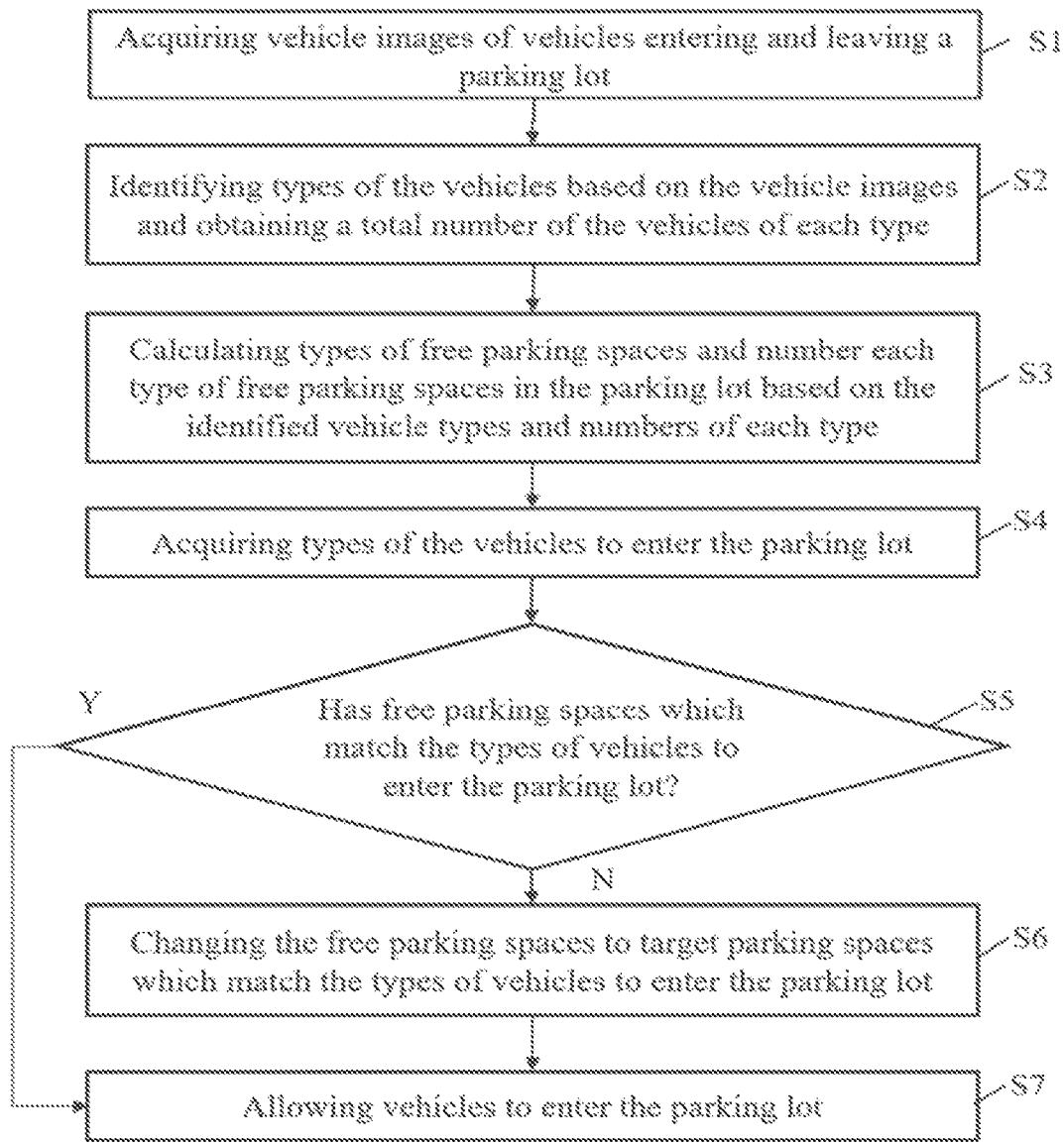
FIG. 4 illustrates flowchart of one embodiment of a method for dynamically configuring parking spaces.

FIG. 4 illustrates a flowchart of a method for dynamically configuring parking spaces for vehicles.

Referring to FIG. 4, the method is provided by way of example, as there are a variety of ways to carry out the method. The method described below can be carried out using the configurations illustrated in FIG. 4, for example, and various elements of these figures are referenced in explaining the method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the computer device 1 acquires vehicle images of vehicles entering and leaving a parking lot. The parking lot includes at least two types of parking spaces, and the at least two types of parking spaces can be changed with each other.

For example, the parking lot can include parking spaces for motorcycle and parking spaces for cars, and the parking spaces for motorcycle can be changed for parking cars, and the parking spaces for cars can be changed for parking motorcycles. For example, if there are lots of motorcycles that need to be parked in the parking lot, parts of the parking spaces for cars can be changed for parking motorcycles; and if there are lots of cars need to be parked in the parking lot, parts of the parking spaces for motorcycles can be changed for parking cars. It can be understood that the parking lot includes at least but not limited to at least two types of parking spaces. The vehicle images can be license plate images or overall images of the vehicle.

At block S2, identifying types of the vehicles based on the vehicle images and obtaining a total number of the vehicles of each type.

In at least one embodiment, by identifying the overall image of the vehicle and sequentially determining the type of the vehicle, or by pre-configuring a corresponding relationship between the license plate number and the vehicle type, the vehicle type can be determined based on the vehicle license plate number. Types of the vehicles can include at least electric vehicles, cars, trucks, and so on.

At block S3, the computer device 1 calculates types of free parking spaces and number each type of free parking spaces in the parking lot based on the identified vehicle types and numbers of each type.

In at least one embodiment, the calculating module 503 calculates types and number of free parking spaces through the types of vehicles entering and exiting the parking lot, the number of corresponding vehicles, and the configuration of parking spaces in the parking lot.

At block S4, acquiring types of the vehicles to enter the parking lot.

In at least one embodiment, the acquiring module 501 acquires the types of the vehicles which entered the parking lot based on the vehicle images.

At block S5, the computer device 1 determines whether the parking lot has free parking spaces which match the types of vehicles to enter the parking lot. In response that there are free parking spaces matching the vehicle to enter the parking lot existing in the parking lot, the process goes to block S7. In response that no free parking space matching the vehicle to enter the parking lot in the parking lot, the process goes to block S6.

In at least one embodiment, determine whether there are corresponding free parking spaces in the parking lot according to the types of vehicles to enter the parking lot.

At block S6, changing the free parking spaces to target parking spaces which match the types of vehicles to enter the parking lot.

At block S7, allowing the vehicles to enter the parking lot.

In at least one embodiment, the parking lot is provided with a plurality of configuration components 400, and the plurality of configuration components 400 are used to configure the parking lot into at least two types of parking spaces. For example, the computer device can change the free parking spaces to the plurality of the target parking spaces by adjusting a plurality of configuration components of the parking lot.

In at least one embodiment, the configuration components 400 can be lamps that can emit visible light.

In at least one embodiment, the configuration components 400 can be LED lights. The computer device can adjust the plurality of configuration components of the parking lot by turning on and/or turning off the LED lights of sides of the free parking spaces. The parking lot can be configured into different parking spaces through the LED lights. For example, four sides of the parking space are equipped with the LED lights. The parking space is available when the LED lights of the four sides are turned on, and the parking space is unavailable when the LED lights of the four sides are turned off. By turning on or off the LED lights to identify part of the at least two parking spaces in the parking lot as available parking spaces and some as unavailable parking spaces, so as to realize the conversion of the at least two types of parking spaces. Please refer to FIG. 5 and FIG. 6, the car 1 to car 10 are parking spaces for vehicles, and electric 1 to electric 10 are parking spaces for motorcycles. By turning on the LED lights of the electric 1 to electric 5 parking spaces, to change the five consecutive parking spaces for motorcycles to a vehicle parking space, as shown in FIG. 6.

The method further includes turning on or off the LED lights surrounding at least two of the parking spaces in the parking lot, so as to realize a conversion of at least two types of parking spaces or the rearrangement of at least two types of parking spaces in at least some areas of the parking lot.

In at least one embodiment, the configuration component 400 may be infrared transmitters or laser transmitters. The configuration components 400 can emit visible light or sensible light to configure the parking lot into different parking spaces.

In at least one embodiment, the method further includes: acquiring dynamic configuration parameters, calculating parking requirements of the plurality of vehicles according to the dynamic configuration parameters, and adjust the at least two types of parking spaces based on the parking requirements.

In at least one embodiment, the dynamic configuration parameters can include weather, time, gathering activities in a proximity to the parking lot, and so on. The time of the dynamic configuration parameters can include working days or rest days, and busy time of one day and free time of one day. For example, there are more motorcycle users on weekdays and fewer car users; there are more motorcycle users on sunny days, and more car users on rainy and snowy days. And if there are gatherings in a proximity to the parking lot, such as social gatherings, expos, and so on, there will be more car users, the parking needs of the two types of vehicles can be calculated accordingly, and the distribution and proportion of at least two parking spaces in the parking lot can be planned according to the parking needs.

Figure 7:
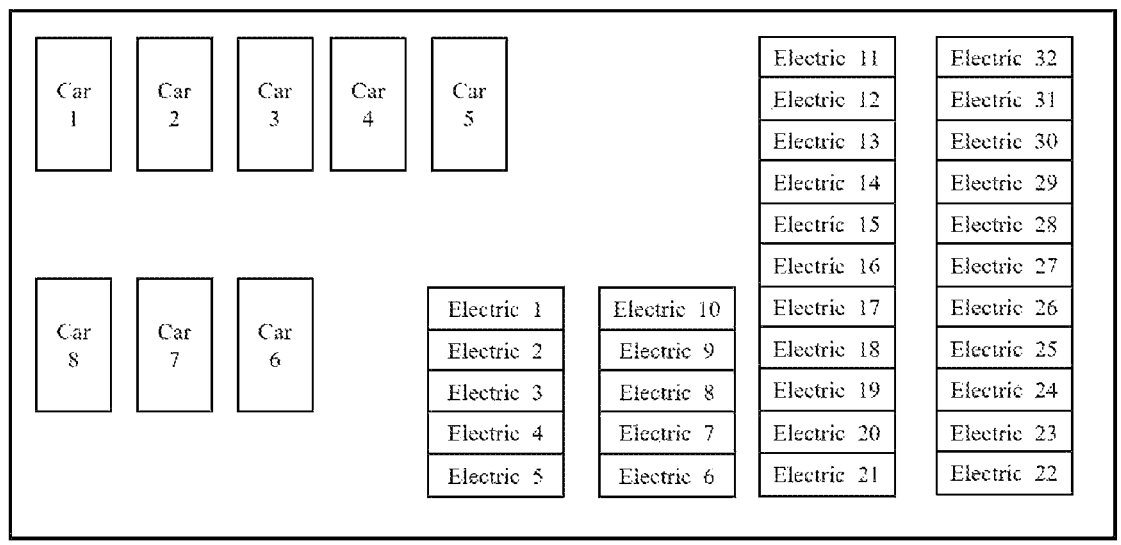
FIG. 7 illustrates a schematic diagram of parking spaces of the parking lot in a third state.
Figure 8:
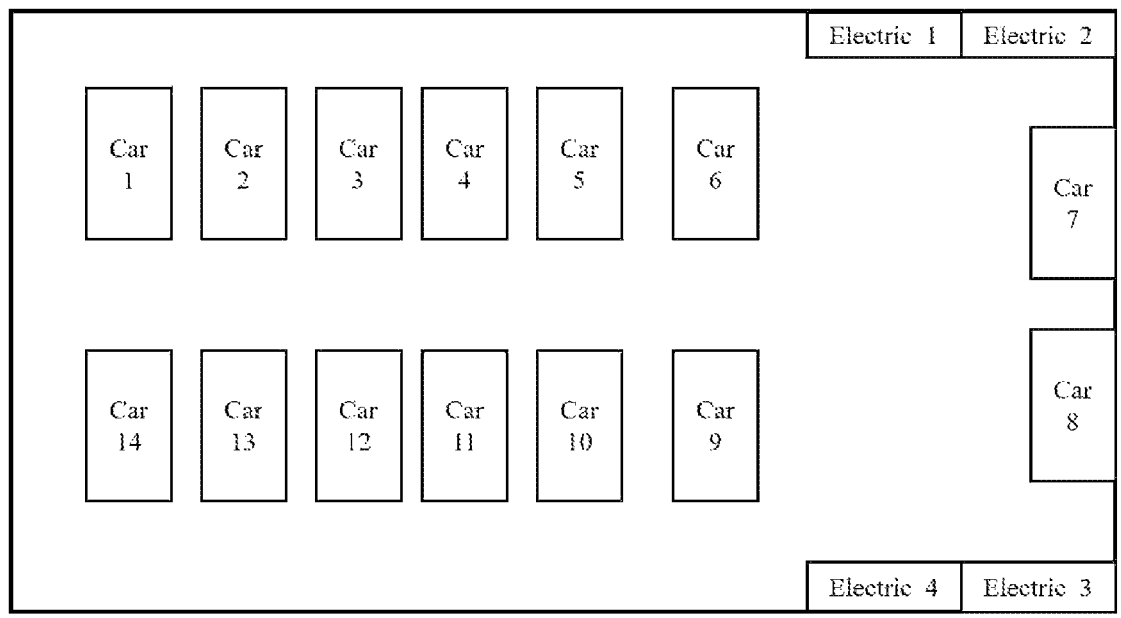
FIG. 8 illustrates a schematic diagram of parking spaces of the parking lot in a fourth state.

Please refer to FIG. 7 and FIG. 8, the number of car parking spaces in the parking lot is 8 and the number of motorcycle parking spaces in the parking lot is 32 and the ratio is 1:4. If the parking demand for motorcycles is small, while the parking demand for cars is large, the two parking spaces in some areas of the parking lot should be rearranged. Please refer to FIG. 8, in the parking lot in FIG. 8, at least two types of parking spaces can be rearranged according to the arrangement of LED lights, and the parking spaces of the parking lot is changed to include fourteen car parking spaces and four motorcycle parking spaces. It can be understood that, according to the parking demand and the specific scene of the parking lot, part or all of the parking lot can be re-arranged for parking spaces, for example, the parking lot is all configured as motorcycle parking spaces.

The above-mentioned method for dynamically configuring parking spaces adapts to different application scenarios through mutual conversion between at least two types of parking spaces in the parking lot, so as to meet the parking requirements of different types of vehicles, and improve the utilization efficiency of the parking lot.

Furthermore, the adaptability of the parking lot can be enhanced by rearranging at least two parking spaces in some areas of the parking lot.

It should be emphasized that the above-described embodiments of the present disclosure, including any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer device comprising:
   at least one processor, and
   a storage device that stores one or more programs, which when executed by the at least one processor, causes the at least one processor to:
   acquire types of vehicles to enter a parking lot, the parking lot comprising at least two types of parking spaces;
   determine whether the parking lot has free parking spaces which match the types of vehicles to enter the parking lot;
   change the free parking spaces to target parking spaces which match the types of vehicles to enter the parking lot in response that the parking lot has free parking spaces which match the types of vehicles to enter the parking lot;
   wherein the at least one processor is further caused to:
   acquire vehicle images of vehicles entering and/or leaving the parking lot;
   identify types of the vehicles based on the vehicle images;

obtain a total number of the vehicles of each of the types of vehicles which are identified;

determine types of the free parking spaces based on the identified types of the plurality of vehicles; and calculate a number of the free parking spaces based on a total number of the vehicles of each of the types of vehicles which are identified.

2. The computer device based on claim 1, wherein the at least one processor is further caused to:

change the free parking spaces to the target parking spaces by adjusting configuration components of the parking lot.

3. The computer device based on claim 2, wherein the configuration components comprise light emitting diode (LED) lights, and the at least one processor is further caused to:

adjust the configuration components of the parking lot by turning on and/or turning off the LED lights on sides of the free parking spaces.

4. The computer device based on claim 1, wherein the at least one processor is further caused to:

acquire dynamic configuration parameters;

calculate parking requirements of the vehicles according to the dynamic configuration parameters; and adjust the at least two types of parking spaces according to the parking requirements.

5. The computer device based on claim 4, wherein the dynamic configuration parameters comprise weather, time, and gathering activities in a proximity to the parking lot.

6. A method for dynamically configuring parking spaces applicable in a computer device, the method comprising:

acquiring types of vehicles to enter a parking lot, the parking lot comprising at least two types of parking spaces;

determining whether the parking lot has free parking spaces which match the types of vehicles to enter the parking lot;

changing the free parking spaces to target parking spaces which match the types of vehicles to enter the parking lot in response that the parking lot has free parking spaces which match the types of vehicles to enter the parking lot;

wherein the method further comprises:

acquiring vehicle images of vehicles entering and/or leaving the parking lot;

identifying types of the vehicles based on the vehicle images;

obtaining a total number of the vehicles of each of the types of vehicles which are identified;

determining types of the free parking spaces based on the identified types of the plurality of vehicles; and calculating a number of the free parking spaces based on a total number of the vehicles of each of the types of vehicles which are identified.

7. The method based on claim 6, wherein the method further comprises:

changing the free parking spaces to the target parking spaces by adjusting configuration components of the parking lot.

8. The method based on claim 6, wherein the configuration components are LED lights, and the method further comprises:

adjusting the configuration components of the parking lot by turning on and/or turning off the LED lights on sides of the free parking spaces.

9. The method based on claim 6, wherein the method further comprises:

acquiring dynamic configuration parameters;

calculating parking requirements of the vehicles according to the dynamic configuration parameters; and adjusting the at least two types of parking spaces according to the parking requirements.

10. The method based on claim 9, wherein the dynamic configuration parameters comprise weather, time, and gathering activities in a proximity to the parking lot.

11. A non-transitory storage medium having stored thereon instructions that, when executed by at least one processor of a computer device, causes the at least one processor to perform a method for dynamically configuring parking spaces, the method comprising:

acquiring types of vehicles to enter a parking lot, the parking lot comprising at least two types of parking spaces;

determining whether the parking lot has free parking spaces which match the types of vehicles to enter the parking lot;

changing the free parking spaces to target parking spaces which match the types of vehicles to enter the parking lot in response that the parking lot has free parking spaces which match the types of vehicles to enter the parking lot;

wherein the method further comprises:

acquiring vehicle images of vehicles entering and/or leaving the parking lot;

identifying types of the vehicles based on the vehicle images;

obtaining a total number of the vehicles of each of the types of vehicles which are identified;

determining types of the free parking spaces based on the identified types of the plurality of vehicles; and calculating a number of the free parking spaces based on a total number of the vehicles of each of the types of vehicles which are identified.

12. The non-transitory storage medium based on claim 11, wherein the method further comprises:

changing the free parking spaces to the target parking spaces by adjusting configuration components of the parking lot.

13. The non-transitory storage medium based on claim 11, wherein the plurality of configuration components are LED lights, and the method further comprises:

adjusting the configuration components of the parking lot by turning on and/or turning off the LED lights on sides of the free parking spaces.

14. The non-transitory storage medium based on claim 11, wherein the method further comprises:

acquiring dynamic configuration parameters;

calculating parking requirements of the vehicles according to the dynamic configuration parameters; and adjusting the at least two types of parking spaces according to the parking requirements.

15. The non-transitory storage medium based on claim 14, wherein the dynamic configuration parameters comprise weather, time, and gathering activities in a proximity to the parking lot.

* * * * *